UNITED STATES PATENT OFFICE.

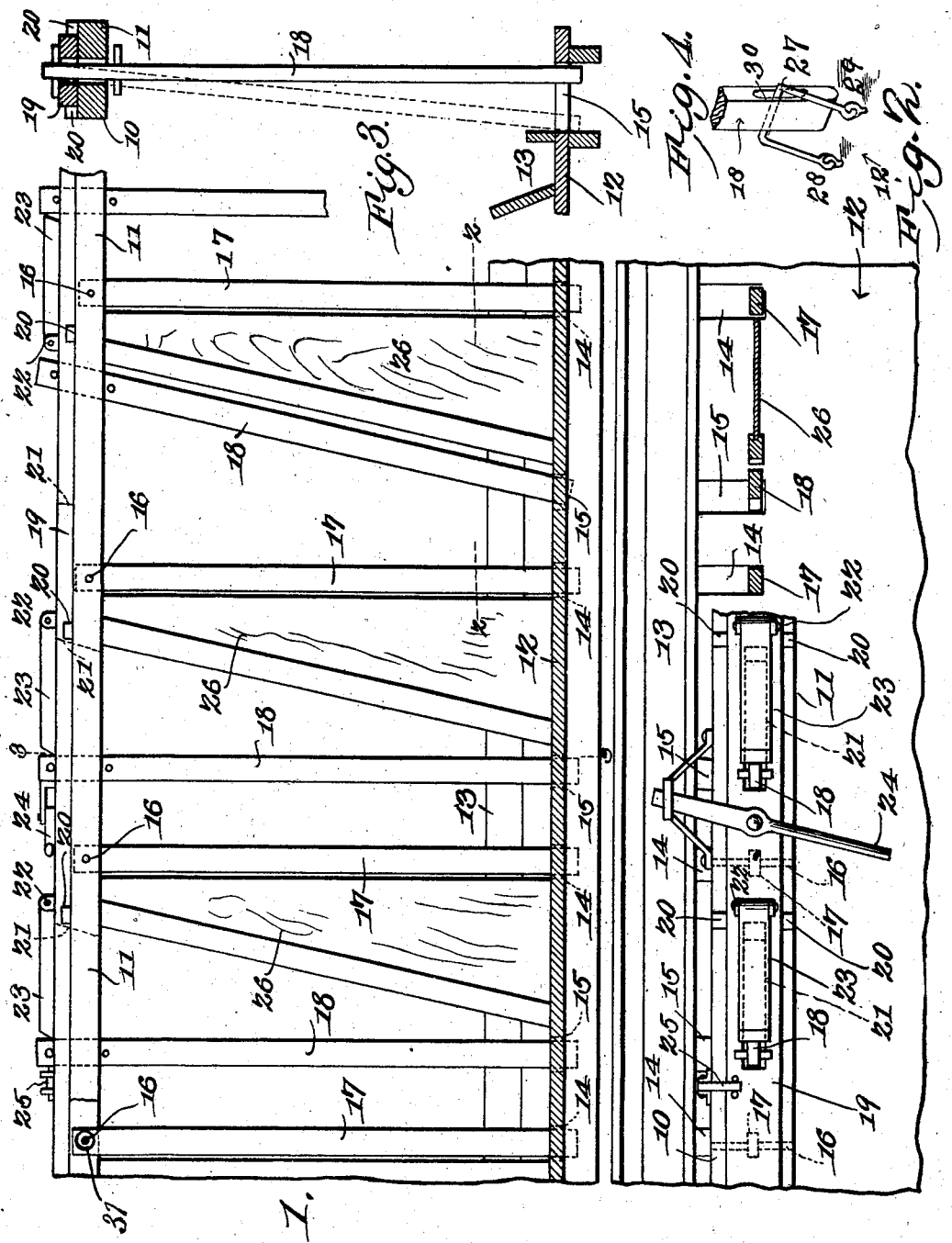

HENRY D. ELLIOTT, OF MORGAN CENTER, VERMONT.

CATTLE-STANCHION.

No. 827,221.     Specification of Letters Patent.     Patented July 31, 1906.

Application filed February 12, 1906. Serial No. 300,729.

*To all whom it may concern:*

Be it known that I, HENRY D. ELLIOTT, a citizen of the United States, residing at Morgan Center, in the county of Orleans and State of Vermont, have invented a new and useful Cattle-Stanchion, of which the following is a specification.

This invention relates to improvements in cattle-stanchions, and has for one of its objects to improve the construction and increase the efficiency and utility of devices of this class.

Another object of the invention is to provide a simply-constructed device of this class wherein the neck-bars are arranged to swing longitudinally of the stall-space to enable the animals to lie down and arise again without straining the neck or striking the knees against the neck-bars or other parts.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is an elevation of a plurality of the improved devices viewed from the stall-space side. Fig. 2 is a plan view with a portion in section on the line 2 2 of Fig. 1. Fig. 3 is a sectional view on the line 3 3 of Fig. 1. Fig. 4 is a detail in perspective illustrating a modification of a portion of the structure.

The improved device may be erected in any required locality where the animals are to be disposed, but is generally employed in barns or stables at the feed ends of the stall-spaces, and comprises a head-frame formed of spaced members 10 11, extending transversely of the feeding-spaces and above the same.

The frame may be of any required length to support any required number of the stanchion devices; but for the purpose of illustration a section is shown containing three of the stanchion devices.

The frame members 10 11 are located at a sufficient distance above the floor 12 of the stall-spaces to accommodate the height of the animals, and the feed-trough 13 is located at the end of the stall-space and beyond the frame members.

The floor 12 is provided with slots or apertures 14 15, spaced apart and arranged in pairs, with one pair centrally of each stall-space, the distance between the slots corresponding to the distance between the neck-bars of the structure.

Pivoted at 16 between the spaced head members 10 11 are neck-bars 17, with their lower ends movably engaging the slots 14, there being one bar to each slot.

The pivots 16 operate through enlarged apertures 31 in the bars 17, and the latter fit with sufficient looseness between the members 10 11 to enable the lower ends of the bars to swing in the slots 14 in the floor toward and away from the feed-trough, as hereinafter explained.

Extending through the space between the members 10 11 are neck-bars 18, and with their lower ends fitting loosely in the slots 15 and movable therein toward and away from the feed-trough, there being one of the bars 18 to each of the slots 15. The bars 17 and 18 are thus both movable at their lower ends toward and away from the feed-troughs or longitudinally of the stall-space, while the bars 18 are also movable at their upper ends toward and away from the bars 17. The slots 14 15 are spaced apart a distance equal to the space usually required between the neck-bars of cattle-stanchions, so that when each pair of the bars 17 18 are arranged in vertical position they are adapted to bear upon the sides of the necks of the animals, and when the transversely-movable bars 18 are released at their upper ends the heads of the animals can be withdrawn.

When the animals attempt to lie down, the bars 17 18 yield to the natural forward movement of the animal and prevent the cramping of the necks or shoulders or the danger of striking the knees against the bars so common when the neck-bars are rigidly constructed. The feed-trough 13 being located in advance of the forward or outer position of the neck-bars is not in position to be struck by the knees of the animal when lying down or rising. Thus the animals are not liable to produce what is known as "big knees," caused by the frequent contact with the rigid neck-bars or feed-troughs of prior structures of this class.

Bearing upon the frame members 10 11 is a shifter-bar 19, through which the upper ends of the neck-bars 18 project. The bar 19 is held in position upon the members 10 11 by guide lugs or stops 20 and is provided with longitudinal slots 21, where the bars 18 project through them, the slots being equal in length to the throw or movement of the bars 18, so that the bars 18 may be independently operated, as hereinafter explained. Pivoted at 22 upon the shifter-bar are stop members 23, bearing at their free ends against the projecting ends of the neck-bars 18 when the neck-bars are in closed position and holding them closed, as at the left in Figs. 1 and 2, and releasing the bars and permitting them to move in the slots 21 when reversed in position, as shown at the right in Fig. 1. Thus the bars 18 will be opened or closed simultaneously by the movement of the shifter-bar 19 when the stop or lock members 23 are in closed position, or one or more of the bars 18 may be independently released, if required, by simply reversing the position of the lock members of the bar or bars it is desired to release.

An operating-lever 24 is connected to the shifter member with which to actuate it, and a stop device 25 is attached at one point to hold the shifter member in closed position.

The angular space between the sets of neck-bars is preferably filled with partitions 26 of suitable construction to prevent access to the feed-trough except between the neck-bars.

When the apparatus is erected in localities where it is not desirable to form apertures in the stall-space floors—as, for instance, in barns or sheds exposed to the cold—and where the apertures would admit too much cold air—the modified construction shown in Fig. 4 will be employed, consisting in attaching bail-shaped rods 27, pivoted at 28 29 to the floor 12, and extending the free or bent portions of the rods through longitudinal slots 30 in the neck-bars, the slots being large enough to permit the requisite movements between the parts.

Having thus described the invention, what is claimed is—

1. In a cattle-stanchion structure, a head-frame including longitudinal rails spaced apart and disposed above the stall-floor, pins spaced apart and extending transversely through said head-rails, a plurality of neck-bars arranged in pairs and extending at one end between said head-frame members, one bar of each of said pairs of neck-bars swinging upon said pins transversely of said head-frame and the other of each of said pairs of neck-bars movable at one end longitudinally of the head-frame and movable at the other end transversely of the head-frame, and means carried by the head-frame for operating the bars which are movable longitudinally of the head-frame.

2. In a cattle-stanchion structure including a stall-space floor and a head-frame spaced from the floor, said floor having spaced sockets extending longitudinally of the same, neck-bars swinging from said head-frame and movably engaging said sockets, and one of said bars also swinging transversely of said floor, and means carried by said head-frame for actuating said transversely-movable bar.

3. In a cattle-stanchion structure including a stall-floor, a head-frame formed with rails spaced apart and likewise spaced above the floor, said floor having spaced sockets extending longitudinally of the same, a neck-bar swinging at one end between said rails and with the free end movably engaging one of said sockets, a neck-bar movable longitudinally of said rails at one end and with the other end movably engaging the other of said sockets, and means for locking said longitudinally-movable bar in position between said rails.

4. In a cattle-stanchion structure including a stall-floor and a head-frame spaced above the floor, said floor having sockets arranged in pairs spaced apart centrally of each stall-space, a plurality of neck-bars arranged in pairs, one bar of each pair swinging at one end from said head-frame and with the free end movably engaging one socket of each pair of the same, and the other bar of each pair movable at one end longitudinally of said head-frame and with the other end movably engaging the other socket of each pair of the same, means for simultaneously actuating said longitudinally-movable bars, and means for independently releasing said longitudinally-movable bars.

5. In a cattle-stanchion structure including a stall-floor and a head-frame spaced above the floor, said floor having sockets arranged in pairs spaced apart centrally of each stall-space, a plurality of neck-bars arranged in pairs, one bar of each pair swinging at one end from said head-frame and with the free end movably engaging one socket of each pair of the same, and the other bar of each pair extending at one end above said head-frame and movable longitudinally thereof and with the other end movably engaging the other socket of each pair of the same, a shipper member movably bearing upon said head-frame and through which the extended ends of said longitudinally-movable bars project, and means for actuating said shipper member.

6. In a cattle-stanchion structure including a stall-floor and a head-frame spaced above the floor, said floor having sockets arranged in pairs spaced apart centrally of each stall-space, a plurality of neck-bars arranged in pairs, one bar of each pair swinging at one end from said head-frame and with the free end movably engaging one socket of each pair of the same, and the other bar of each pair extending at one end above said head-frame and movable longitudinally thereof and with the other end movably engaging the other socket of each pair of the same, a shipper member movably bearing upon said head-frame and provided with slots corresponding to and adapted to receive the extended ends of said longitudinally-movable bars, means for actuating said shipper member, and locking members adapted to maintain said extended bars at one end of said slots and independently releasable from the same.

In testimony that I claim the foregoing as my own I have hereto affixed my signature in the presence of two witnesses.

HENRY D. ELLIOTT.

Witnesses:
GEORGE W. BRYANT,
JOHN A. CALKINS.